(12) United States Patent
Yamada et al.

(10) Patent No.: US 7,707,605 B2
(45) Date of Patent: Apr. 27, 2010

(54) DATA TRANSMISSION METHOD AND SYSTEM OF SAME, INFORMATION PROCESSING METHOD AND SYSTEM OF SAME, DATA TRANSMITTER, SIGNAL PROCESSOR, CONTENT DATA PROCESSING METHOD, AND DATA SERVING METHOD

(75) Inventors: Isao Yamada, Tokyo (JP); Jun Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1345 days.

(21) Appl. No.: 09/733,332

(22) Filed: Dec. 8, 2000

(65) Prior Publication Data

US 2001/0014906 A1    Aug. 16, 2001

(30) Foreign Application Priority Data

Dec. 10, 1999    (JP)    ................ 11-352231

(51) Int. Cl.
*G06F 13/00*    (2006.01)
*G06F 3/00*    (2006.01)
*H04N 7/173*    (2006.01)

(52) U.S. Cl. .................. 725/48; 725/40; 725/44

(58) Field of Classification Search ............ 725/32, 725/34, 36, 42, 89–90, 133, 135, 141, 153, 725/40, 44, 48; 463/1, 30–35, 40–44; 345/418, 345/473
See application file for complete search history.

(56) References Cited

U.S. PATENT DOCUMENTS

| 5,051,822 | A | * | 9/1991 | Rhoades ................ 725/131 |
| 5,181,107 | A | * | 1/1993 | Rhoades ................ 725/133 |
| 5,737,527 | A | * | 4/1998 | Shiels et al. ............ 725/114 |
| 5,802,284 | A | * | 9/1998 | Karlton et al. ........... 725/32 |
| 5,835,717 | A | * | 11/1998 | Karlton et al. ........... 725/46 |
| 5,892,554 | A | * | 4/1999 | DiCicco et al. .......... 348/584 |
| 5,987,509 | A | * | 11/1999 | Portuesi ................ 725/113 |
| 6,177,931 | B1 | * | 1/2001 | Alexander et al. ........ 725/52 |
| 6,227,974 | B1 | * | 5/2001 | Eilat et al. .............. 463/40 |
| 6,324,694 | B1 | * | 11/2001 | Watts et al. ............. 725/32 |
| 6,357,042 | B2 | * | 3/2002 | Srinivasan et al. ....... 725/32 |

(Continued)

FOREIGN PATENT DOCUMENTS

JP    11-27649    1/1999

(Continued)

*Primary Examiner*—Hunter B. Lonsberry
(74) *Attorney, Agent, or Firm*—Finnegan, Henderson, Farabow, Garrett & Dunner, L.L.P.

(57) ABSTRACT

A liquid crystal display includes a liquid crystal display panel having a plurality of pixels on a display line. A set of drivers drives a set of pixels, the set of drivers receiving display data and providing video signals to the set of pixels. A clock provides a clock signal to the set of drivers to latch the display data based on a frequency of the clock signal, and receives a feedback signal from the set of drivers prior to an end of the display data received by the set of drivers. A delay circuit stops the clock signal to the set of drivers, based on the feedback signal, after delaying for a first time period that is no less than a predetermined time period between the feedback signal and the end of the display data received by the set of drivers.

29 Claims, 5 Drawing Sheets

U.S. PATENT DOCUMENTS

| | | | |
|---|---|---|---|
| 6,425,825 B1 * | 7/2002 | Sitrick | 463/31 |
| 6,445,398 B1 * | 9/2002 | Gerba et al. | 715/721 |
| 6,681,393 B1 * | 1/2004 | Bauminger et al. | 463/40 |
| 2002/0007493 A1 * | 1/2002 | Butler et al. | 725/109 |
| 2002/0016962 A1 * | 2/2002 | Decarmo | 725/28 |
| 2002/1006248 * | 5/2002 | Slaney et al. | 725/42 |
| 2003/0133043 A1 * | 7/2003 | Carr | 725/151 |

FOREIGN PATENT DOCUMENTS

| | | |
|---|---|---|
| WO | WO 9926415 A1 * | 5/1999 |

* cited by examiner

FIG. 3
(A) 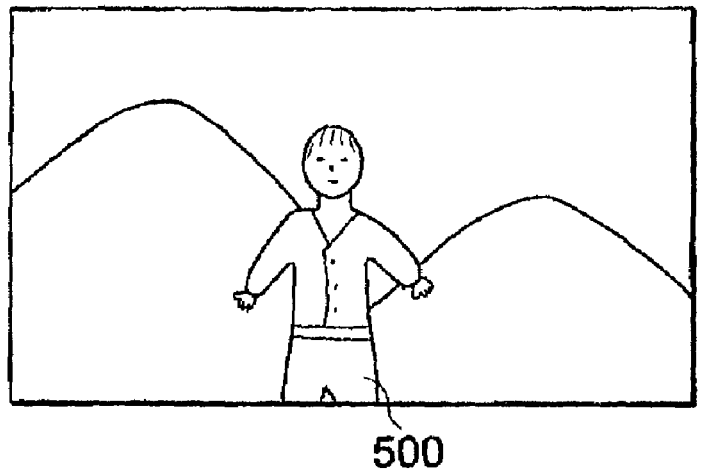
500
(B) 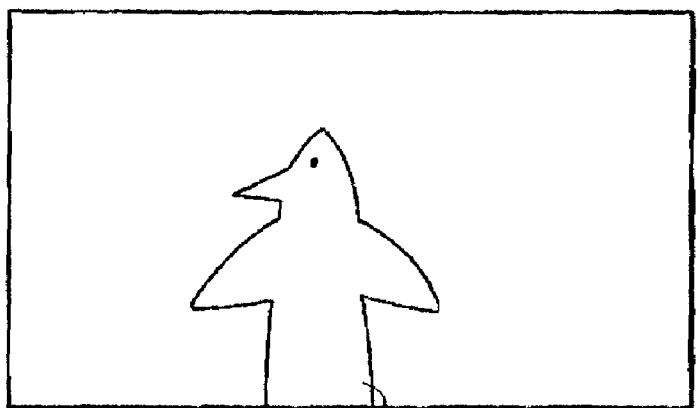
510
(C) 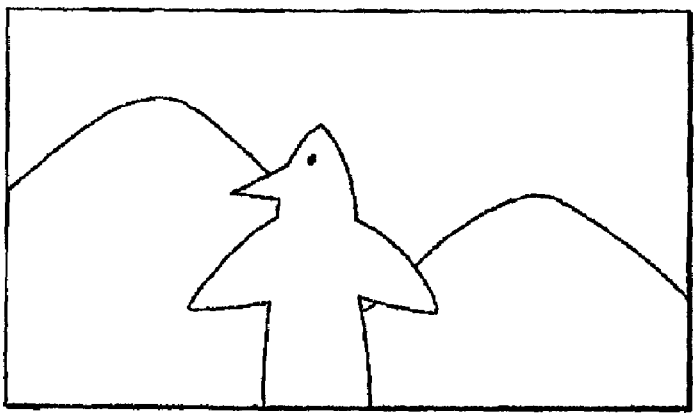

DATA TRANSMISSION METHOD AND SYSTEM OF SAME, INFORMATION PROCESSING METHOD AND SYSTEM OF SAME, DATA TRANSMITTER, SIGNAL PROCESSOR, CONTENT DATA PROCESSING METHOD, AND DATA SERVING METHOD

BACKGROUND OF THE INVENTION

1. Field of the Invention

The present invention relates to a broadcasting method and a broadcast system for broadcasting a signal from a broadcasting station etc. for reception and viewing at the home etc., more particularly relates to a data transmission method and a data transmission system enabling the receiving end to combine the received signal with a signal from a game equipment or another signal processor, an information processing method and an information processing system for processing information in a desired manner using such a setup, a data transmitter used for such a system, a signal processor serving as home end terminal apparatus of such a system, and a content data processing method and a data serving method applied to such a system.

2. Description of the Related Art

In recent years, a television game systems have rapidly become popular. Their performance has also become very high. For example, there are now even television game systems provided with 64-bit or 128-bit high speed processors as the signal processors, provided with DVD drives as the storage systems, and provided with a special processors for high speed graphics. Such high performance game systems enable more realistic video and audio output and more complicated signal processing and therefore enable more interesting and fun games.

Further, advances in communication technologies have made possible diverse types of broadcasting systems. In Japan, for example, in addition to the usual ground wave broadcasts, there are now several satellite broadcast systems and cable television systems. Further, satellite digital broadcasts and ground wave digital broadcasts will soon be offered. These new systems not only make possible improved quality of video and audio signals, but also the broadcasting of various information in addition to the main audio and video signals. Further, two-way systems enabling individual homes to communicate with the broadcasting station in response to the broadcasted programs etc. are being realized.

Summarizing the disadvantages to be solved by the invention, even in such recent television game systems and television broadcasting systems, there are several disadvantages which have to be resolved in order to enable more effective and more convenient use. Further improvement is therefore desired.

First, usual television games are played by running software off of different media. Various situations and scenes are successively generated. Even in complicated games, however, there is a limit to the situations, scenes, etc. Once the player experiences the series of situations and scenes and watches the video etc., he or she then ends up rapidly losing interest, that is, becomes bored. This characteristic of television games is the same no matter how high the performance the television game system becomes. This is one of the main disadvantages with television game systems.

Further, software for television games takes a long time to develop. Therefore, it is difficult to incorporate the latest news, fashions, etc. such as obtained from television broadcasts. Namely, it is very difficult to provide timely contents closely related to the real world.

Further, some television game software become very popular and sell millions of copies. Also, some purchasers play them over the television monitor for relatively long hours. Accordingly, this makes them very attractive as advertisement media. Up until now, however, there have been few examples of effective usage as advertisement media. The reason for this seems to be that, as mentioned above, television game software is not updated daily or weekly like the programs of television broadcasts, newspapers, or magazines, but takes a long time to develop making it difficult to place timely advertisements in it. Further, game software tends strongly to be considered as an integral work of art. The creators of these games are therefore said to be averse to the placement of advertisements in their game software.

On the other hand, programs of television broadcasts lack the interactivity and unpredictability taken for granted in television games, so lacks interestingness.

The same can be said for the advertisements as well. Each viewer is simply shown the same advertisement every time. Namely, there are no commercials enabling the viewer to select information of interest from among several options or unpredictably changing the information given every time. Further, present television broadcasts do not enable interested viewers to obtain more detailed information or to actually order product catalogs or the products themselves.

Further, the same television monitor is used for both watching television broadcasts and playing television games. Up until now, however, this has been done by switching the mode of the television monitor. In other words, the television broadcasts and the television games have formed completely separate systems. There has never been a system which combines these to provide some sort of service or new sound or picture.

As a system resembling this, there is the television broadcasting system disclosed in Japanese Unexamined Patent Publication (Kokai) No. 11-27649. In this system, the viewer operates the game system or the like to create content for a program and transmits the same to the broadcasting station. The broadcasting station then creates a program for actual broadcasting based on the transmitted content and broadcasts it. This enables the creation of new types of programs such as viewer participation programs and programs showing games being played with the participation of a plurality of viewers.

In this system, however, the content viewed by the viewer is in the final analysis created by the broadcasting station. The system is therefore no different from conventional broadcasting systems. Namely, it is not a system that combines content obtained by television broadcasting and content obtained from television game systems in some form for use at the home.

Further, this system cannot be realized without an uplink line to the broadcasting station.

SUMMARY OF THE INVENTION

An object of the present invention is to provide a data transmission method and system capable of combining audio and video content obtained from a television broadcast and audio and video content obtained by running for example package software on for example a television game system or operation and control information etc. from that television game system so that there functions can mutually complement each other and effective functions can be suitably provided for PR, shopping, and other various purposes or so that programs or games of a more enjoyable and non-boring content suitably matching the interests of the viewer can be provided.

Another object of the present invention is to provide an information processing method and system capable of combining audio and video content obtained from a television broadcast and audio video content obtained from a television game system or the like or operation and control information thereof so that the audio and video content can be suitably processed as desired and new forms of PR, shopping, etc. can be realized.

Still another object of the present invention is to provide a data transmitter suitable for use in such a data transmission system or information processing system.

Still another object of the present invention is to provide a signal processor suitable for use as for example a home terminal for such a data transmission system or information processing system.

Still another object of the present invention is to provide a content data processing method suitable for application to such a data transmission system or information processing system.

Still another object of the present invention is to provide a data serving method suitable for application to such a data transmission system to information processing system.

According to a first aspect of the present invention, there is provided a data transmission method comprising the steps of transmitting transmission data containing content data and auxiliary data provided for signal processing at the viewer end, having the viewer end receive the transmitted transmission data, processing content data of the result of a desired first signal processing performed based on data recorded in advance and the content data contained in the received transmission data by second signal processing using the auxiliary data contained in the received transmission data to create new output content data, and outputting the output content data.

According to a second aspect of the present invention, there is provided a data transmission system having a transmitter for transmitting transmission data and a plurality of viewer apparatuses for receiving the transmitted data, wherein the transmitter transmits transmission data containing content data and auxiliary data provided for the processing in the viewer apparatuses, and each viewer apparatus comprises a receiving means for receiving the transmitted transmission data, a first signal processing means for performing a desired signal processing according to software stored in advance and input operation signals and outputting content data including video data, an operating means for the viewer to perform an operation and outputting an operation signal based on the related operation to the first signal processing means, a second signal processing means for performing a predetermined processing on the content data output from the first signal processing means and the content data contained in the received transmission data using the auxiliary data contained in the received transmission data so as to create output content data, and an outputting means for outputting the created output content data.

According to a third aspect of the present invention, there is provided a data transmission system having a transmitter for transmitting transmission data and a plurality of viewer apparatuses for receiving the transmitted data, wherein the transmitter transmits transmission data containing content data including video data and command data for controlling the receiver end viewer apparatuses, and each viewer apparatus comprises a receiving means for receiving the transmitted transmission data, a signal processing means for performing desired signal processing according to software stored in advance and operations of the viewer and outputting content data including video data, a signal combining means for combining the video data of the content data contained in the received transmission data with a predetermined region of the video data of the content data output from the signal processing means to create the output content data containing new video data, and an outputting means for outputting the created output content data.

According to a fourth aspect of the present invention, there is provided an information processing method comprising the steps of having the transmitting end create content data and transmit transmission data containing the content data and auxiliary data provided for the signal processing on the viewer end, having a viewer end receive the transmitted transmission data, perform a desired first signal processing performed based on data stored in advance at the viewer end, process the content data obtained as the result of the first signal processing and the content data contained in the received transmission data by second signal processing using the auxiliary data contained in the received transmission data to create new output content data, output the output content data, and transmit data of at least one of the result of the first signal processing and the result of the second signal processing from the viewer end to the transmitting end, and having the transmitting end perform a desired information processing based on the transmitted data to create content data for transmission based on the information processing result.

According to a fifth aspect of the present invention, there is provided an information processing system having a transmitter for transmitting transmission data and a plurality of viewer apparatuses for receiving the transmitted data, wherein the transmitter has a content data creating means for creating the content data, a transmitting means for transmitting transmission data containing the created content data and auxiliary data provided for signal processing on the viewer end, and an information processing means for performing a desired information processing based on the data transmitted from the viewer apparatuses, the content data creating means creates the content data to be transmitted based on the information processing result, the each of the viewer apparatuses has a receiving means for receiving the transmitted transmission data, a first signal processing means for performing a desired first signal processing based on data stored in advance, a second signal processing means for processing the content data obtained as the result of the first signal processing and the content data contained in the received transmission data by second signal processing using the auxiliary data contained in the received transmission data to create new output content data, an outputting means for outputting the created output content data, and a transmitting means for transmitting at least one of the result of the first signal processing and the result of the second signal processing to the transmitter.

According to a sixth aspect of the present invention, there is provided a data transmitter having a transmission data creating means for creating transmission data containing content data and auxiliary data provided for predetermined signal processing in a viewer apparatus and a transmitting means for transmitting the created transmission data to a plurality of viewer apparatuses.

According to a seventh aspect of the present invention, there is provided a signal processor for receiving transmitted transmission data containing content data and predetermined auxiliary data, comprising a receiving means for receiving the transmitted transmission data, a first signal processing means for performing a desired signal processing according to software stored in advance and operations of a viewer and outputting content data containing video data, a second signal processing means for processing the content data output from the first signal processing means and the content data contained in the received transmission data by predetermined processing using the auxiliary data contained in the received transmission data to create output content data, and an outputting means for outputting the created output content data.

According to an eighth aspect of the present invention, there is provided a content data processing method comprising the steps of receiving as input first content data obtained from a first medium, second content data obtained from a second medium, and auxiliary data provided for signal processing obtained from a third medium different from the second medium and performing signal processing with respect to at least the second content data by using the auxiliary data to create third content data.

According to a ninth aspect of the present invention, there is provided a data serving method comprising the step of providing first content data, second content data, and auxiliary data for controlling signal processing performed with respect to at least the second content data to create new content data to terminal apparatus.

BRIEF DESCRIPTION OF THE DRAWINGS

These and other objects and features of the present invention will become clearer from the following description of the preferred embodiments given with reference to the attached drawings, in which:

FIGS. 3A to 3C are views for explaining processing for replacing an object of broadcasted program data by a character of a television game system and viewing the same in the signal processing system shown in FIG. 1;

DESCRIPTION OF THE PREFERRED EMBODIMENTS

A preferred embodiment of the present invention will be explained by referring to FIG. 1 to FIG. 5.

In the present embodiment, the present invention will be explained by taking as an example a signal processing system combining a signal broadcast from a broadcasting station and a signal output from a home game system for various processing and a home system for the same.

First, an explanation will be made of the configuration of the signal processing system.

Figure 1:
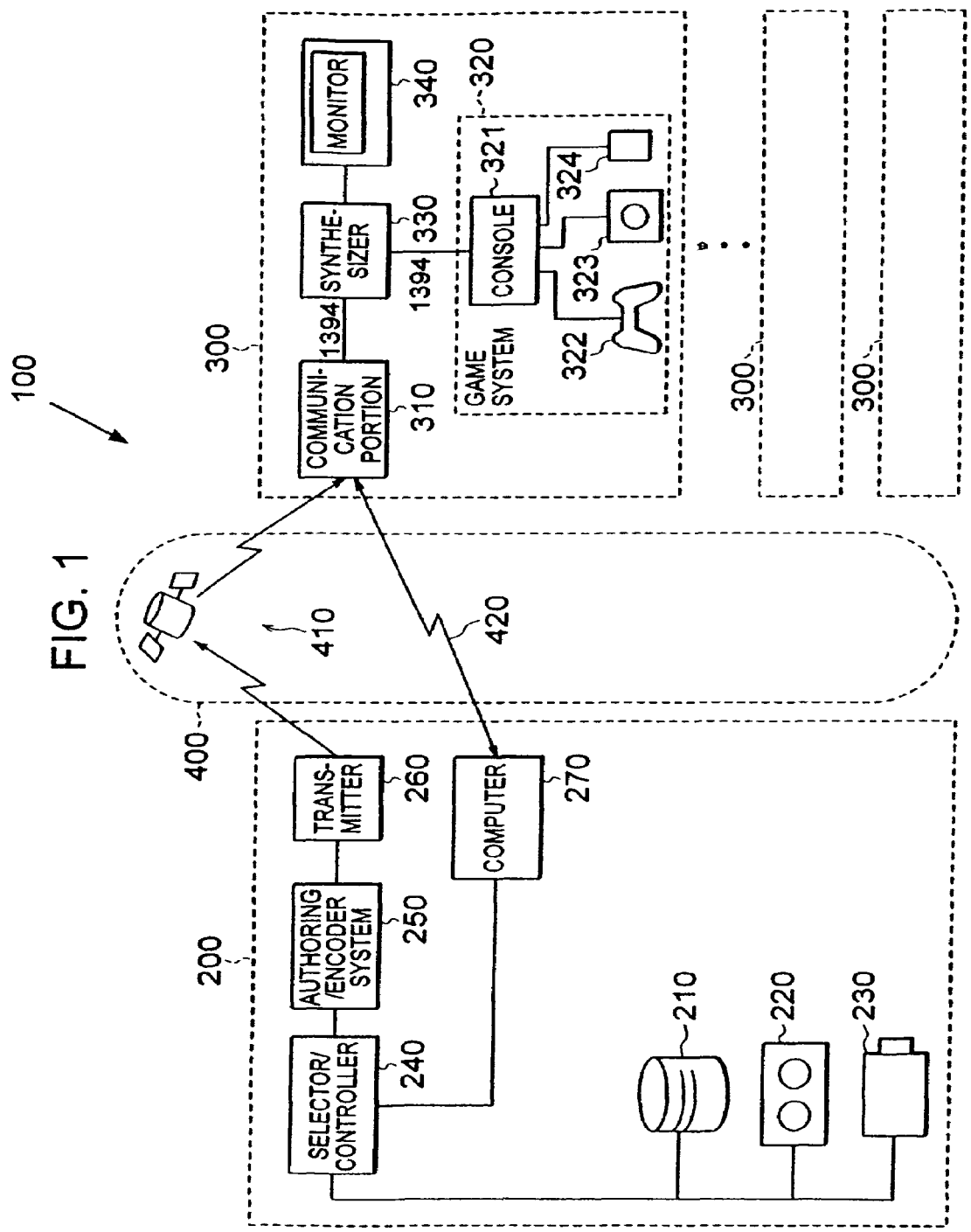
FIG. 1 is a block diagram of the configuration of a signal processing system of an embodiment of the present invention.

FIG. 1 is a block diagram of the configuration of a signal processing system 100 of the present embodiment.

The signal processing system 100 has a broadcasting station system 200, a home system 300, and a communication network 400.

The broadcasting station system 200 has a server 210, a video reproduction apparatus 220, a video camera 230, a selector/controller 240, an authoring/encoder system 250, a transmitter 260, and a computer 270.

The server 210 is a large capacity hard disk drive which stores digital data of various types of broadcast use stock such as program content. The data stored in the server 210 is suitably reproduced according to a broadcast schedule managed by a not illustrated scheduler and output to the selector/controller 240.

The video reproduction device 220 plays back a video tape on which is recorded various broadcast use stock such as program content set according to need and outputs the same to the selector/controller 240.

The video camera 230 is a camera for capturing picture and sound for when broadcasting a live program such as news or for when using a live picture of a later explained host etc. in a broadcast. The captured video signals and audio signal are output to the selector/controller 240 according to need.

The selector/controller 240 creates a broadcast use signal, that is, prepares the program, based on the video signal and audio signal input from the server 210, video reproduction device 220, and the video camera 230 and outputs the same to the authoring/encoder system 250.

The selector/controller 240 selects the required video signal and audio signal automatically or manually by the operation of a program producer based on a control signal from the not illustrated scheduler and information such as a request from the viewer transmitted from the home system 300 of the viewer mentioned later via a public telephone line 420 to the computer 270 of the broadcasting station system 200 and combines them or otherwise processes them according to need to create the broadcast use program data, and outputs the same to the authoring/encoder system 250.

Note that the production of this program in the selector/controller 240 is carried out for every channel sent by the broadcasting station system 200.

Figure 2:
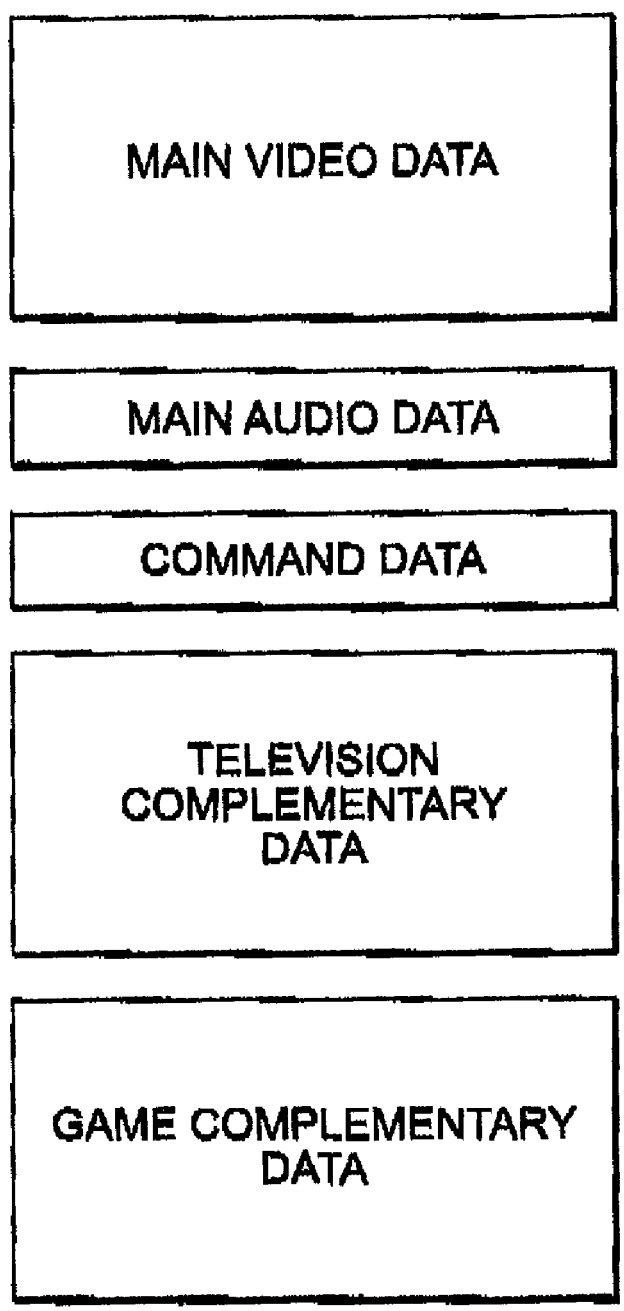
FIG. 2 is a view of the configuration of a broadcast signal transmitted from a broadcasting station system of the signal processing system shown in FIG. 1.

Here, the configuration of the broadcast signal created at the selector/controller 240 is shown in FIG. 2.

As shown in FIG. 2, the broadcast signal transmitted from the broadcasting station system 200 basically has main video data, main audio data, command data, television complementary data, and game complementary data.

The main video data is the video data for usual viewing of a television program by a viewer.

The main audio data is the audio data for usual viewing of a television program by a viewer.

The command data is the data from the broadcasting station system 200 for directly controlling the home system 300 per se or a game system 320 or a synthesizer 330 of the home system 300 mentioned later.

The television complementary data is sub information of the main video data and the main audio data and is data such as picture, sound, and text to be displayed and output to a monitor 340 of the home system 300 according to need.

The game complementary data is data such as sub information relating to the processing to be performed in the game system 320 and not stored in the home system 300. Specifically, it is data such as unique game characters for only the broadcast, information of special rules, and unique background images.

The authoring/encoder system 250 encodes the program data input from the selector/controller 240 by for example MPEG, converts the same to a predetermined broadcast format such as XML and MPEG, and outputs the same to the transmitter 260.

The transmitter 260 encodes, modulates, and otherwise processes for transmission the broadcast use program data converted to the predetermined broadcast format input from the authoring/encoder system 250 so as to convert the same to a signal suitable for the broadcasting means used and actually transmits the same. In the present embodiment, it is assumed that the broadcasting station system 200 performs digital satellite broadcasting by a satellite line 410 via a broadcast satellite. Accordingly, the transmitter 260 transmits the created broadcast use signal toward the broadcast satellite.

The computer 270 is connected to the public telephone line 420 and performs a desired information processing. It receives a response relating to the broadcast content broadcast by the broadcasting station system 200, that is, a signal transmitted from the home system 300 of each viewer via the public telephone line 420, stores the information from the viewers, and determines the action to be taken in the broadcasting station system 200 in accordance with the received content. Then, according to need, the computer 270 instructs the selector/controller 240 to produce the program data based on that action.

The home system 300 has a communication portion 310, a game system 320, a synthesizer 330, and a monitor 340.

The communication portion 310 receives the broadcast data sent from the broadcasting station system 200 via the satellite line 410, demodulates it and decodes the transmission use code to create a digital baseband signal, and transmits the same via an IEEE1394 interface to the synthesizer 330. Further, when information such as a certain instruction or data to be transmitted to the broadcasting station system 200 is input from the synthesizer 330 via the IEEE1394 interface, the communication portion 310 transmits the information via the public telephone line 420 to the computer 270 of the broadcasting station system 200.

The game system 320 is a home television game system and has a game system console 321, a controller 322, storage medium I/F 323, and an IC card I/F 324.

The game system console 321 runs the game according to game software stored on the storage medium mounted in the storage media I/F 323 and moves the game along based on data similarly read from the storage medium and operation signals of the user input from the controller 322. It creates a video signal to be displayed on the monitor and an audio signal to be output from the monitor 340 and outputs the same via the IEEE1394 interface to the synthesizer 330.

Further, the game system console 321 performs predetermined processing according to commands of command data received from the broadcasting station system 200 and input from the synthesizer 330 mentioned later. When further additional data is necessary when executing the commands, the data is transmitted from the broadcasting station system 200 as complementary data. The game system console 321 executes the processing by using this.

The controller 322 is a joy stick or directional button pad or other game controller provided with various inputting means suitable for playing the game. When playing a usual television game, the player operates the controller 322 to run the game. Further, when the home system 300 receives a broadcast from the broadcasting station system 200 and performs some sort of operation with respect to the received content, the viewer inputs instructions from this controller 322 while viewing the monitor 340.

The storage medium I/F 323 is loaded with a storage medium storing the program and data for the game. It suitably reads out the program and data in response to requests from the game system console 321 and outputs the same to the controller 322.

The IC card I/F 324 is an I/F for writing or reading data with respect to the mounted IC card. In this game system 320, an IC card is used for example for storing the results of the game, storing the interim progress of the game, inputting personal data to the game system console 321, or storing data from the game system console 321.

The synthesizer 330 extracts the data of the main video data, main audio data, command data, television complementary data, and the game complementary data from the received broadcast signal having the structure shown in FIG. 2 input from the communication portion 310.

Further, the synthesizer 330 receives from the game system 320 for example a signal of the results of the game, a signal obtained from the package medium, and a signal created based on the command data and the game complementary data extracted from the broadcast signal in the synthesizer 330.

The synthesizer 330 combines the extracted main video data, main audio data, and television complementary data with the data input from the game system 320 according to need based on for example the extracted command data to create one video signal and audio signal able to be output from the monitor 340 and outputs the same to the monitor 340.

Further, the synthesizer 330 outputs at least the command data for the game system 320 among the command data and the game complementary data to the game system 320.

Further, when the data input from the game system 320 is an instruction for transmitting certain information to the broadcasting station system 200, the synthesizer 330 outputs the instruction to that effect to the communication portion 310.

The monitor 340 displays the video signal input from the synthesizer 330 on a screen and outputs the audio signal input from the synthesizer 330.

Next, an explanation will be made of the operation of the signal processing system 100 having such a configuration.

First, an explanation will be made of the basic operation of the signal processing system 100.

First, the selector/controller 240 of the broadcasting station system 200 creates the main video data and the main audio data by for example combining the picture captured from the video camera 230 with video stock data obtained from the server 210 and the video reproduction apparatus 220.

Further, it adds data used for replacement of the main video data and main audio data or for performing certain processing with respect to the main video data and the main audio data as the television complementary data.

Further, it adds the data provided for the processing performed in the game system 320 of the home system 300 and used for replacement of the video data and audio data supplied from the package medium in the game system 320 or for performing certain processing with respect to the video data and audio data as the game complementary data.

Then, while making suitable use of the television and game complementary data, it creates command data for the game system 320 and the synthesizer 330 for enabling the desired AV data processing in the home system 300 and thereby creates the broadcast use signal shown in FIG. 2.

Then, the created broadcast use signal is authored and encoded in the authoring/encoder system 250, encoded, modulated, and otherwise processed for transmission in the transmitter 260, and transmitted to the home system 300 via the satellite line 410.

The home system 300 receives the broadcast from the broadcast system 200 in a state with the medium storing the desired television game software loaded in the storage medium I/F 323 of the game system 320.

The synthesizer 330 demultiplexes the signal received at the communication portion 310 to the main video data, main audio data, command data, and the television complementary data and outputs the command data and the game complementary data for the game system 320 to the game system 320.

The game system 320 performs the desired processing on the data read from the package medium, an application executed according to the software read from the package medium, or the input game complementary data based on the input command data and operation of the controller 322 by the viewer so as to create the video signal and the audio signal to be output to the monitor 340 or to be provided for a further processing in the synthesizer 330 and outputs them to the synthesizer 330.

The synthesizer 330 performs desired processing on the received main video data and main audio data or television complementary data and further the video data and the audio data input from the game system 320 based on the input command data, for example, the combination of a plurality of the data, to create the final video signal and audio signal to be output to the monitor 340.

Then, the created video signal and audio signal are output from the monitor 340.

As a result, new content obtained by combining content seemingly close to usual program data based on the main video data and the main audio data and content obtained by the desired processing of for example the game in the game system 320 is created and output from the monitor 340.

Further, when the viewer operates the controller 322 of the game system 320 based on information output from for example the monitor 340 in order to transmit for example the selection or request of new information, selection of reception conditions, and notification of the reception state from the home system 300 to the broadcasting station system 200, a signal based on this operation is transmitted from the game system 320 to the synthesizer 330 and transmitted from the communication portion 310 via the public telephone line 420 to the computer 270 of the broadcasting station system 200.

In the broadcasting station system 200, the computer 270 performs the processing relating to this signal and instructs the selector/controller 240 to change the structure of the broadcast signal according to need.

Next, the various services which become possible in a signal processing system 100 having such a configuration and operation will be successively explained by giving concrete examples.

First, such a signal processing system 100 can make a character of a television game appear in a television program and thereby provide a new form of entertainment. Such processing will be explained next.

First, in the broadcasting station system 200, the selector/controller 240 combines for example a picture of the host captured from the video camera 230 with the video stock obtained from the server 210 or the video reproduction device 220 to create the broadcast use signal having the main video signal as shown in for example FIG. 3A.

At this time, it uses the main video data, main audio data, and television complementary data to create a broadcast use signal of a configuration enabling the picture of the host captured from the video camera 230 to be easily separated from the rest of the video signal.

The method may also be considered of storing background data of the region where the host of the main video data will be displayed as the television complementary data so that the host will be erased by combining for example the television complementary data and the main video data or conversely making the main video data video data without a host and separately sending the video of the host as the television complementary data. Further, the method may also be used of adding an address of a position occupied by the host in the main video data as the complementary data.

Next, the selector/controller 240 creates instructions on timing of use, situation of use, etc. of the television complementary data as command data and adds it to the broadcast use signal.

Then, the broadcast use signal created in this way is authored and encoded in the authoring/encoder system 250, encoded, modulated, etc. for transmission in the transmitter 260, and transmitted via the satellite line 410 to the home system 300.

The home system 300 loads for example a medium storing the television game software containing the desired character shown in FIG. 3B in the storage medium I/F 323 of the game system 320 and receives the broadcast from the broadcasting station system 200.

The synthesizer 330 demultiplexes the received signal into the main video data, main audio data, command data, television complementary data, etc.

Then, basically the main video data and the main audio data are output to the monitor 340 for viewing of the program. Upon a switch command of the command data or instruction by the viewer from the controller 322, however, the synthesizer 330 cuts out the host (replaced object) data 500 of the main video data shown in FIG. 3A and instead inserts the data of the character (replacement object) 510 read from the storage media I/F 323 of the game system 320 as shown in FIG. 3B in the video signal.

As a result, the monitor 340 display a picture as shown in FIG. 3C obtained by combining the picture of the character read from the television game package software via the storage medium I/F 323 with a picture of a television broadcast showing the real world or persons. Due to this, the character of a game can be made to appear in a picture of the real world.

By doing this, the viewer can newly experience a view of a game character, which had previously been limited in movement to the finite world stored in the package software in advance, moving around in the real world, and therefore can experience a new form of entertainment using package software which he or she had finished playing.

Further, the signal processing system 100 can transmit new data by such a broadcast to a game run by software stored on a package medium in the game system 320 and therefore expand the conditions, development, etc. of the game. Such processing will be explained next.

The method of creation of the broadcast signal, the method of the broadcast, etc. are the same as the methods explained above, but in this case, a broadcast signal containing the data to be newly added to the game as the game complementary data and containing commands for installing the complementary data as the command data is broadcast.

The home system 300 receiving such a broadcast signal demultiplexes the game complementary data and the command data at the synthesizer 330 and inputs the same to the game system 320. The game system console 321 of the game system 320 introduces the complementary data into the game software already loaded thereon based on the commands of the command data.

Below, a concrete explanation will be made of how a game can be expanded by such processing.

For example, when what is being played on the game system 320 is a fight game, by transmitting data of a new fight opponent as the game complementary data and superposing a command for incorporating the game complementary data as the command data, the game system 320 can run the game while introducing a new fight opponent which did not exist in the package software.

Further, when what is being played on the game system 320 is a role playing game etc., by transmitting data of a new stage as the game complementary data and superposing a command for incorporating the game complementary data as the command data, the game system 320 can run the game while additionally introducing a new stage which did not exist in the package software.

Further, when what is being played on the game system 320 is a game such as a baseball game or a soccer game, by transmitting character data employing players active in the real world as the game complementary data and superposing a command for incorporating the game complementary data as the command data, the game system 320 can introduce for example a rookie player newly starting to be active in the real world into the game and enable enjoyment of a more realistic and on-the-scene game.

In addition, by broadcasting stock prices, exchange rates, a weather, rankings in professional baseball, hit charts and music thereof, and other various information of the real world or any other information in accordance with the game as the game complementary data and superposing a command for introducing the game complementary data as the command data, it is possible to enjoy a game incorporating real-time information of the real world.

Further, it is possible to create a game predicated on introduction of information of the real world from the start, for example, a game simulating the purchase of stock, bets on horse races, or bets on soccer tournaments.

Further, by broadcasting game complementary data for making for example the image data of the game higher in definition and command data for reflecting that complementary data, it is possible to enjoy a game on a higher definition screen which could not be experienced by only the package software.

Further, by having the signal processing system 100 combine processing with respect to a television program as mentioned above and processing with respect to the game system, it is possible to provide a program combining information from the package media and information by the broadcast. Such processing will be explained next.

The method of creating the broadcast signal, the method of broadcast, the processing in the home system 300, etc. are the same as the methods explained above. In this case, a broadcast signal is broadcast adding data for expanding the program data as the television complementary data, adding data to be newly added to the processing of the game in the game system 320 etc. as the game complementary data, and adding commands for controlling the program data and the data of the game, including commands for controlling the game system 320 from the broadcasting station system 200, as the command data. Due to this, it is possible to provide a program combining game software and a broadcast program while controlling the game system 320 of the home system 300 from the broadcasting station system 200.

For example, when broadcasting a game strategy program or a game-production documentary, by broadcasting commands for operating an actual game system 320 included in the broadcast signal, it is possible to proceed with the program while remotely controlling the game system 320 by command data from the broadcasting station system 200 end. By proceeding with the program while combining the image created by operating the game system 320 of the user and the real picture wherein the host etc. appear, it is possible to for example more effectively illustrate the strategy in the game or inside stories of production.

Further, in for example a game strategy program, by transmitting information enabling a beginner who is not proficient in a game to more easily enjoy the game, that is, operational information enabling one to beat a better player even with a low capability level in a fight game, auxiliary information speeding up the progress of a role playing game, settings of special rules not existing in the package software, etc., it is possible to provide a service enabling a considerably beginning class user to experience the thrill of a game designed for a higher class user or a high stage that cannot be reached by his or her own capability.

Note that, in this case, a user who doesn't have the game software can enjoy only the main picture and the main sound.

Further, by having the signal processing system 100 broadcast content different from the main video data and the main audio data in the television complementary data, it is possible to provide the following types of broadcasts.

For example, when broadcasting a game strategy program, it is possible to broadcast a program for a beginning class user as the main video and main audio data and broadcast a program for a high level user as the television complementary data and to have the user operate the controller 322 of the game system 320 to select one of the same. By doing this, the user can view a program matching his or her own level.

Further, in a broadcast such as a usual drama, it is possible to provide several story lines different from the main video and main audio data using the television complementary data. Then, by having the viewer select any of these or according to the status of a game being played by the viewer or randomly for every home system 300 based on a command transmitted as the command data, one story line is selected and output to the monitor 340. By doing this, it is possible to broadcast a drama unfolding with several branching story lines as the program content.

Such a format imparts a game-like unpredictability, bidirectionality, and multiple story lines to television broadcast content which everyone had previously identically viewed passively.

Further, it is also possible to have the signal processing system 100 operate in cooperation with media distributed to the home as package media by the above configuration. By employing such a format, the following processing can be carried out.

First, characters or game screens which can not be seen by a usual game operation are stored in advance in the package software. Then, these characters or game screens are called up by the command data when broadcasting a specific program by the main video and main audio data. By doing this, it is possible to provide content newly enjoyable by only viewers watching a broadcast, upgrade the version of the game to a new stage after a while from the release of the package software, or provide other services.

Next, an explanation will be made of a format in the case when using the signal processing system 100 having such a configuration as an advertisement medium.

First, there is an advertisement format that provides advertisement information different between the main video and main audio data and the television complementary data and the game complementary data by a broadcast or package medium or a combination of the same and selectively outputs it to the monitor 340 by the selection of the viewer or unspecifically according to the state etc. of a game being played by the viewer or according to some sort of conditions described in the command data. By doing this, a TV commercial rich in unpredicted or unexpected changes can be realized.

Further, a format is also possible wherein, when a viewer watching an advertisement by the above format becomes interested in the product, the viewer can operate the controller 322 of the game system 320 to request a catalog, place an order for the product, answer a questionnaire, apply for a prize, etc. to the computer 270 of the broadcasting station system 200 via the synthesizer 330, communication portion 310, and the public telephone line 420.

Further, it is also possible to provide points for the purchases of products or viewing of advertisements and therefore offer a so-called "point service".

By utilizing such a format, two-way communication of TV commercials and television shopping can be realized.

Further, a format can also be considered wherein advertisement information of a specific advertiser is additionally broadcast as game complementary data at predetermined time intervals and the broadcasted advertisement of the advertiser is displayed on the screen of a game when a user is playing a game in the game system 320 of the home system 300. The position of the advertisement in the game may be fixed to a predetermined position on the game screen or may be set to a billboard or wall or a label of a product in the game depending on the game software. By doing this, it is possible to change the sponsor according to the time or date even in the same game. Further, since the advertisement information may be transmitted later by broadcasting, the software of the game can be produced taking a long time as in the conventional case and respecting the wishes of the creators.

Further, in a format where the user can play a game with different sponsors assigned for predetermined times as mentioned above, it is also possible to collect score information etc. of ending information of the game of the viewers at the computer 270 of the broadcasting station system 200 and assign rankings according to the scores or order of arrival. Then, the sponsor can then provide privileges or prizes to for example the viewers of the highest rankings. By doing this, it is possible to encourage the combination of TV commercials and the game and make this type of advertisement more effective.

Next, an explanation will be made of use of the signal processing system 100 having such a configuration as a system for purchasing show tickets.

Figure 4:
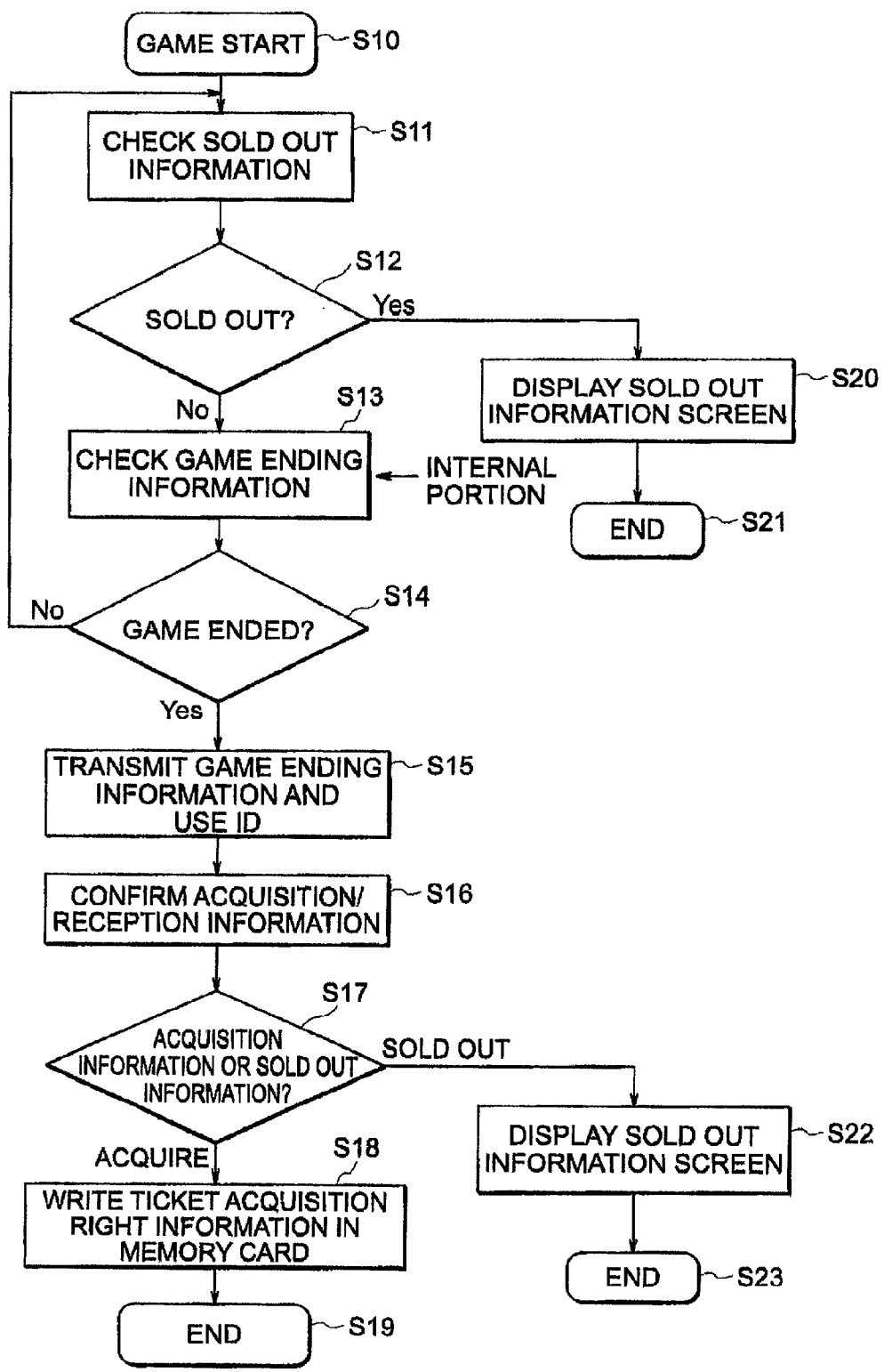
FIG. 4 is a flow chart for explaining processing in a home system when selling tickets by the signal processing system shown in FIG. 1.
Figure 5:
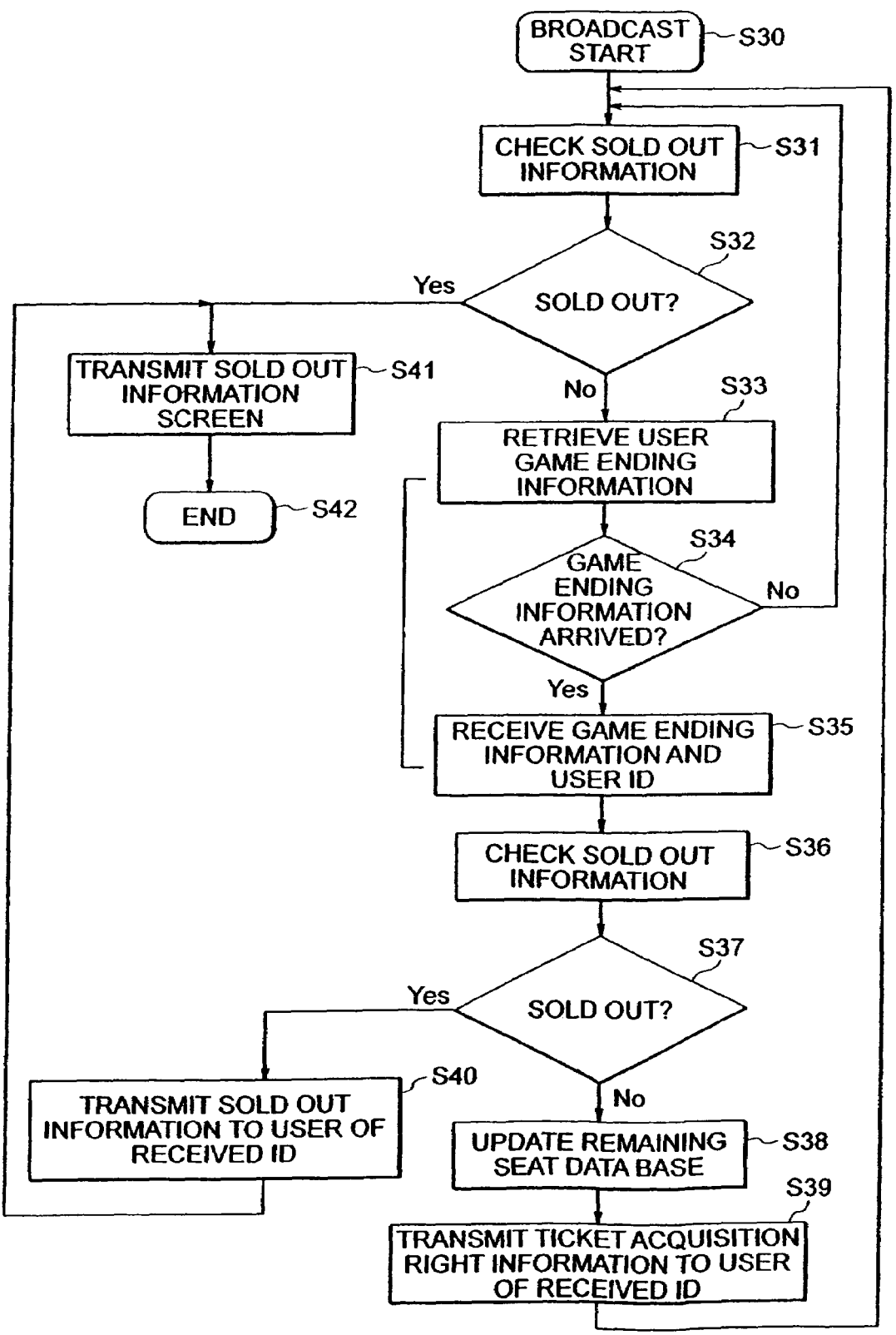
FIG. 5 is a flow chart for explaining processing in the broadcasting station system when selling tickets by the signal processing system shown in FIG. 1.

Here, an explanation will be made of a system adding entertainment to the processing for purchasing of the ticket, running a game preceding the purchase of the ticket, and selling tickets on a priority basis to viewers finishing the game fastest by referring to the flow charts of FIG. 4 and FIG. 5.

First, game software for purchasing tickets is distributed to the viewers in advance by broadcast or package media. Then, at the time of start of the sale of the tickets, the broadcasting station system 200 broadcasts a "ticket sale program" and starts the sale of the tickets in parallel to this broadcast.

Below, first, an explanation will be made of the processing in the home system 300 by referring to the flow chart of FIG. 4.

The viewer desiring to purchase a ticket receives the "ticket sale program" broadcast by the broadcasting station system 200 and starts the game (step S10).

The synthesizer 330 of the home system 300 confirms the sale information of the ticket based on the broadcasted data (step S11) and checks whether or not it has been sold out (step S12).

When it has not yet been sold out, it confirms the ending information of the game being performed in the game system 320 (step S13) and checks whether or not the game is ended (step S14). If the game has not been ended, it repeats the processing from the confirmation of the sale information of step S11.

When the game has been terminated at step S14, it transmits the ending information of the game and an user ID indicating the ID of the viewer via the communication portion 310 to the broadcasting station system 200 (step sis).

Then, it confirms acquisition/reception information from the home system 300 indicating whether or not the ticket could be acquired or which seat could be acquired etc. (step S16). When a ticket could be acquired (step S17), it writes ticket acquisition right information in an IC card loaded in the IC card I/F 324 of the game system 320 (step S18) and terminates the series of ticket acquisition processing (step S19).

At step 12, when the tickets had been already sold out even though the game has not yet been terminated, it displays sold out information on the monitor 340 (step S20) and terminates the series of the ticket acquisition processing (step S21).

Further, at step S17, when the game could be ended, but the tickets have been already sold out, it displays the sold out information on the monitor 340 (step S22) and terminates the series of the ticket acquisition processing (step S23).

Next, an explanation will be made of the processing in the broadcasting station system 200 by referring to the flow chart of FIG. 5.

In the broadcasting station system 200, after starting the broadcast of the "ticket sale program" (step S30), the computer 270 performs processing.

First, it checks the sold out information of the tickets (step S31). When they have not been sold out (step S32), it searches for game ending information transmitted from a home system 300 via the public telephone line (step S33) and checks whether or not the game ending information has arrived (step S34).

When game ending information has arrived (step S34), it receives the ID of the user (step S35), checks again the sold out information of the tickets (step S36), confirms again that the tickets have not been sold out (step S37), updates the remaining seat data base of the tickets (step S38), and transmits ticket acquisition right information to the user of the received ID (step S39).

After transmitting the ticket acquisition right information at step S39 and when the game ending information has not arrived at step S34, the operation routine returns to step S31, after which the processing from the checking of the sold out information is repeated again.

Further, when the tickets have been sold out at step S37, it transmits the sold out information to the user of the ID transmitting the game ending information (step S40), transmits a sold out information screen (step S41), and terminates the ticket sale program.

Further, when the tickets have been sold out at step 32 as well, it transmits the sold out information screen (step S41) and terminates the ticket sale program.

Note that the program transmitted from the broadcasting station system 200 has for example the host confirming the state of remaining seats of the tickets etc. over a monitor.

In the conventional method of telephone reservations, when the telephone lines are congested and one cannot get through, one cannot find out that the tickets have been sold out, so has to continue to try to call until getting through and only then learns the tickets are sold out. By using the above system, however, it is possible to easily confirm when tickets have been sold out.

Further, the viewer can confirm the seat which he or she has acquired in the television program.

Note that, for ticket sales, it is also possible for example to enable persons who have purchased tickets to view a message of thanks from the performing artist conversely to enable viewers who were not able to purchase tickets view a message of apology from the performing artist.

Further, a similar method can be applied to the sale of for example the limited distribution goods or software other than tickets.

As explained above, according to the signal processing system 100 of the present embodiment, by combining the signal processing of for example a television game using package media and real-time signal processing by a broadcast, a, variety of new services can be provided.

For example, it becomes possible to view a received broadcast while actually operating the game software, therefore, a game strategy program or other program for explaining the package software can be provided in a more impressive manner.

Further, by complementing the software of a television game by data from a broadcast or adding information of the real world, it is possible to provide a user with fresh entertainment expanded at any time after the user has experienced the finite information recorded in the software in advance.

Further, new game entertainment of game software linked with the real world can be provided.

Further, a secondary new additional value can be given to once sold package software and a corresponding new business can be created.

Further, the selectivity, unpredictability, and other elements of a game can be introduced into a television broadcast and therefore another new form of entertainment can be provided.

Further, in television commercials, commercials of a format never before existing, for example, enabling a user interested in the advertised product or the like to request further detailed information, actually order a catalog of the product or the product itself, or select information of interest from among a plurality of choices, or commercials having unpredictability can be provided.

Note that the present invention is not limited to the present embodiment and includes various suitable modifications.

For example, the interface between the components in the home system 300 is not limited to an IEEE1394 interface. Any interface, for example, a USB can be used too.

Further, in the embodiment, the home system 300 was configured by four components of the communication portion 310, game system 320, synthesizer 330, and monitor 340 contained in different housings. However, it is possible to employ a configuration where any combination of them, for example the communication portion 310 and synthesizer 330 or the communication portion 310, game system 320, and synthesizer 330, is contained in one housing. Further, any configuration can be used when mounting the same.

Further, in the present embodiment, the broadcasting station system 200 broadcasted to the home system 300 by a digital satellite broadcast, but the broadcast method is not limited to this. It may be an analog satellite broadcast or digital or analog ground wave broadcast. Further, it may be a broadcast over a cable television system and an Internet broadcast system.

Further, the route for feedback of a signal from the home system 300 to the broadcasting station system 200 is not limited to one using a public telephone line as in the present embodiment. Use can be made of any communication system, for example a dedicated line or the Internet or a system utilizing the two-way characteristic of a cable television system. Note that this feedback communication route is not indispensable in the present invention. The system of the present invention can stand even when transmitting a signal in one direction by a broadcast.

Further, in the present embodiment, the explanation was made of various types of broadcast services and the information services according to the present invention, but the processing relating to charging for the provided services and contents was not described. However, it is also possible to incorporate a mechanism for charging for the provided service and contents in the signal processing system 100 by any method. Such a system is also within the scope of the present invention. For example, it is also possible to utilize the charging mechanisms of existing satellite broadcasts and other pay broadcasts so as to collect charges for provision of the additional value.

Summarizing the effects of the invention, it is possible to provide a data transmission method and system which can combine audio and video content obtained by a television broadcast and audio and video content obtained by running for example package software in for example a television game system or operation and control information etc. from that television game system so as to have these functions complement each other and provide functions effective for a variety of objectives such as publicity and shopping or provide more enjoyable and less boring content of programs, games, etc. suitable for the interests of the viewer.

Further, it is possible to provide an information processing method and system which can combine the audio and video content obtained by a television broadcast and the audio and video content obtained from a television game system or the like or operation and control information, etc. thereof and perform suitable processing based on the audio and video content for publicity, shopping, and other objectives in new formats.

Further, it is possible to provide a data transmitter suitable for use in such data transmission system and information processing system.

Further, it is possible to provide a signal processor suitable for use as for example a home terminal in such data transmission system and information processing system.

Further, it is possible to provide a content data processing method suitable for application to such data transmission system and information processing system.

Further, it is possible to provide a data serving method suitable for application to such data transmission system and information processing system.

What is claimed is:

1. A data transmission method comprising:
    broadcasting, from a transmitter to a viewer apparatus, television content data, command data, and complementary data;
    receiving the television content data, the command data, and the complementary data at the viewer apparatus;
    generating first output content data at the viewer apparatus, without requiring any transmission to the transmitter, the generating of the first output content data comprising:
        (i) outputting an operation signal based on an operation performed by a viewer; and
        (ii) processing software stored in a data storage medium using the operation signal as an input to generate the first output content data;
    incorporating the complementary data into the first output content data, according to commands of the command data, to generate second output content data; and
    outputting the second output content data to a monitor.

2. A data transmission method according to claim 1, further comprising, at the viewer apparatus, combining the first output content data with the television content data to generate the second output content data.

3. A data transmission method according to claim 1, wherein the first output content data at the viewer apparatus comprises data that describes a game character, and
further comprising, at the viewer apparatus, replacing video data of a predetermined object contained in the television content data with the data describing the game character to generate the second output content data.

4. A data transmission method according to claim 1, wherein one or both of the television content data and the complementary data comprise advertisement data, and
further comprising, at the viewer apparatus, combining the first output content data with the advertisement data to generate the second output content data.

5. A data transmission method according to claim 1, wherein one or both of the television content data and the complementary data comprise a plurality of advertisement data, and further comprising selectively combining one or more of the plurality of advertisement data with the first output content data to generate the second output content data.

6. A data transmission method according to claim 1, further comprising:
transmitting feedback data from the viewer apparatus to the transmitter; and
at the transmitter, updating the television content data for broadcast based on the feedback data.

7. A data transmission method according to claim 1, further comprising receiving additional command data at the viewer apparatus, and wherein
processing the software stored in the storage medium comprises processing the software based on the additional command data.

8. A data transmission system having a transmitter for broadcasting data and a plurality of viewer apparatuses for receiving the data, wherein
the transmitter broadcasts television content data, command data, and complementary data, and
each viewer apparatus of the viewer apparatuses comprises:
a receiving means for receiving the television content data, the command data, and the complementary data;
a generating means for generating first output content data without requiring any transmission to the transmitter, the generating means comprising:
(i) an operating means for a viewer to perform an operation and to output an operation signal based on the operation;
(ii) a first signal processing means for processing software stored in a data storage medium using the operation signal as an input to generate the first output content data;
a second signal processing means for incorporating the complementary data into the first output content data, according to commands of the command data, to generate second output content data; and
an outputting means for outputting the second output content data to a monitor.

9. A data transmission system according to claim 8, wherein each of the viewer apparatuses further comprises a transmitting means for transmitting feedback data to the transmitter, and wherein the transmitter is adapted to prepare at least one of the television content data, the command data, and the complementary data for broadcast based on the feedback data.

10. A data transmission system according to claim 8, wherein the first output content data comprises data that describes a game character, and wherein the second signal processing means of each of the viewer apparatuses is adapted to replace video data of a predetermined object contained in the television content data with the data describing the game character to generate the second output content data.

11. A data transmission system according to claim 8, wherein one or both of the television content data and the complementary data comprise advertisement data, and wherein the second signal processing means of each of the viewer apparatuses is adapted to combine the first output content data and the advertisement data to generate the second output content data.

12. A data transmission system according to claim 8, wherein one or both of the television content data and the complementary data comprise a plurality of advertisement data, and wherein the second signal processing means of the viewer apparatus is adapted to selectively combine the first output content data with one or more of the plurality of advertisement data to generate the second output content data.

13. A data transmission system having a transmitter for broadcasting data and a plurality of viewer apparatuses for receiving the data, wherein
the transmitter broadcasts television content data, command data, and complementary data, the complementary data comprising video data, and
each viewer apparatus of the viewer apparatuses comprises:
a receiving means for receiving the television content data, the command data, and the complementary data;
a generating means for generating processed television data that comprises video data without requiring any transmission to the transmitter, the generating means comprising:
(i) an operating means for a viewer to perform an operation and to output an operation signal based on the operation; and
(ii) a signal processing means for processing software stored in a removable recording medium using the operation signal as an input to generate the processed television content data that comprises video data;
a signal combining means for incorporating the video data of the complementary data into a predetermined region of the video data of the processed television content data, according to commands of the command data, to generate output content data that comprises video data; and
an outputting means for outputting the output content data to a monitor.

14. A data transmission system according to claim 13, wherein the complementary data comprises advertisement data, and
wherein the signal combining means of each of the viewer apparatuses is adapted to combine the advertisement data with a predetermined region of the video data of the processed television content data to generate the output content data comprising the video data.

15. A data transmission system according to claim 14, wherein the signal combining means of each of the viewer apparatuses is adapted to selectively combine the advertisement data with the processed television content data to generate the output content data.

16. An information processing method comprising:
generating, at a transmitter, television content data, command data, and complementary data, and broadcasting the television content data, the command data, and the complementary data to a viewer apparatus;

receiving, at the viewer apparatus, the television content data, the command data, and the complementary data;
generating first output content data at the viewer apparatus, without requiring any transmission to the transmitter, the generating of the first output content data comprising:
(i) outputting an operation signal based on an operation performed by a viewer; and
(ii) processing software stored in a data storage medium at the viewer apparatus using the operation signal as an input to generate the first output content data;
incorporating the complementary data into the first output content data, according to commands of the command data, to generate second output content data;
outputting the second output content data to a monitor;
transmitting at least one of the first output content data and the second output content data from the viewer apparatus to the transmitter as feedback data; and
at the transmitter, processing the feedback data to update the television content data for broadcast.

17. An information processing system comprising a transmitter for broadcasting data and a plurality of viewer apparatuses for receiving the data,
the transmitter comprising:
a data generating means for generating television content data, command data, and complementary data;
a first transmitting means for broadcasting the television content data, the command data, and the complementary data to the viewer apparatuses; and
an information processing means for processing feedback data received from the viewer apparatuses to output a processing result;
wherein the content data creating means generates the television content data to be broadcasted based on the processing result;
and each viewer apparatus of the plurality of viewer apparatuses comprising:
a receiving means for receiving the television content data, the command data, and the complementary data;
a generating means for generating first output content data without requiring any transmission to the transmitter, the generating means comprising:
(i) an operating means for a viewer to perform an operation and to output an operation signal based on the operation; and
(ii) a first signal processing means for processing software stored in a data storage medium using the operation signal as an input to generate the first output content data;
a second signal processing means for incorporating the complementary data into the first output content data, according to commands of the command data, to generate second output content data;
an outputting means for outputting the second output content data to a monitor; and
a second transmitting means for transmitting at least one of the first output content data and the second output content data to the transmitter as the feedback data.

18. A data transmitter for transmitting data to a plurality of viewer apparatuses, each of the viewer apparatuses being adapted to:
generate first output content data at the viewer apparatus, without requiring any transmission to the transmitter, the generating of the first output content data comprising:
(i) outputting an operation signal based on an operation performed by a viewer; and
(ii) processing software stored in a data storage medium using the operation signal as an input and based on command data, to generate the first output content data;
(iii) incorporate complementary data into the first output content data, according to commands of the command data, to generate second output content data; and
(iv) output the second output content data to a monitor, the data transmitter comprising:
a data generating means for generating television content data, the command data to control the generation of the first output content data and to control the generation of the second output content data, and the complementary data; and
a broadcasting means for broadcasting the television content data, the command data, and the complementary data to the plurality of viewer apparatuses.

19. A data transmitter according to claim 18, further comprising:
a receiving means for receiving feedback data transmitted from the plurality of viewer apparatuses; and
a computer means for collecting the feedback data transmitted from the plurality of viewer apparatuses and performing a predetermined computation to generate a result,
wherein the data generating means is adapted to generate data based on the feedback data or the result of the predetermined computation.

20. A data transmitter according to claim 18, wherein the data generating means is adapted to generate the television content data to comprise video data and is adapted to generate the command data to comprise information for replacing a predetermined object in the video data with another object.

21. A data transmitter according to claim 18, wherein the data generating means is adapted to generate one or both of said the television content data and the complementary data to comprise advertisement data that includes video data.

22. A signal processor for receiving data from a transmitter, the signal processor comprising:
a receiving means for receiving television content data, command data, and complementary data from a transmitter;
a generating means for generating first output content data without requiring any transmission to the transmitter, the means for generating the first output content data comprising:
(i) an operating means for a viewer to perform an operation and to output an operation signal based on the operation; and
(ii) a first signal processing means for processing software stored in a data storage medium using the operation signal as an input to generate the first output content data;
a second signal processing means for incorporating the complementary data into the first output content data, according to commands of the command data, to generate second output content data; and
an outputting means for outputting the second output content data to a monitor.

23. A signal processor according to claim 22, wherein the first signal processing means is adapted to control the processing of the software based on the command data.

24. A signal processor according to claim 22, wherein the second signal processing means is adapted to combine video data of the first output content data with a predetermined region of video data of the television content data to generate the second output content data.

25. A signal processor according to claim 24, wherein the first output content data comprises data that describes a game character, and wherein the second signal processing means is adapted to replace video data of a predetermined object contained in the television content data with the data describing the game character to generate the second output content data.

26. A signal processor as set forth in claim 22, wherein the second signal processing means is adapted to combine video data of the television content data with a predetermined region of video data of the first output content data to generate the second output content data.

27. A signal processor according to claim 22, wherein the second signal processing means is adapted to combine the first output content data with advertisement data contained in the television content data to generate the second output content data.

28. A signal processor according to claim 27, wherein the second signal processing means is adapted to selectively combine one or more of a plurality of advertisement data contained in the television content data with the first output content data to generate the second output content data.

29. A signal processor according to claim 22, further comprising a transmitting means for transmitting feedback data to the transmitter.

* * * * *